Patented Jan. 8, 1946

2,392,326

UNITED STATES PATENT OFFICE 2,392,326

SUBSTITUTED DIHYDROIMIDAZOLES

Lucas P. Kyrides, Webster Groves, Mo., assignor to Monsanto Chemical Company, St. Louis, Mo., a corporation of Delaware No Drawing. Application August 13, 1943, Serial No. 498,583

9 Claims. (Cl. 260—309.6)

The present invention relates to the production of new therapeutic agents and insecticide toxicants which are substituted imidazoline compounds, and comprises the method of producing the compounds as well as the new products themselves.

According to the present invention, generally stated, new products which are of outstanding value in the treatment of various diseases are made by preparing substituted dihydroimidazoles of the type represented by the formula:

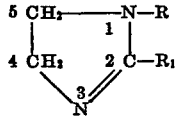

in which R represents an acyclic hydrocarbon radical having from 10 to 16 carbon atoms in its structure and $R_1$ represents an acyclic hydrocarbon radical having from 1 to 5 carbon atoms in its structure. The acyclic hydrocarbon radical represented by R may be composed of a straight chain alkyl radical such as the decyl, undecyl, dodecyl, tridecyl, tetradecyl, pentadecyl and hexadecyl radicals, or a straight chain alkenyl radical, such as decenyl, undecenyl, dodecenyl, tridecenyl, tetradecenyl, pentadecenyl and hexadecenyl radicals in which one or more double bonds may be located in various positions in the chain. $R_1$ may be a straight chain alkyl radical such as the methyl, ethyl, propyl, butyl and amyl radicals, or a branched chain alkyl radical such as the isopropyl, tertiary butyl and isoamyl radicals. Likewise, $R_1$ may be an alkenyl radical having from 1 to 5 carbon atoms in its straight or branched chain structure, for example, the propenyl, butenyl and isobutenyl radicals. The water-soluble salts of these compounds may be prepared and are also valuable therapeutic agents and insecticide toxicants. For example, the hydrochlorides, hydrobromides and acetates and other salts may be employed.

The new products and their water-soluble salts may be administered orally or parenterally and have been found to be unusually effective in the treatment of various diseases. The organic and inorganic acid salts may be prepared by dissolving the products in an aqueous solution containing the stoichiometrical equivalent of a suitable acid, such as hydrochloric, hydrobromic, acetic acids and the like, and the solution may be employed for parenteral administration. Also, the acid salts may be prepared during the synthesis of the imidazoline derivative or immediately thereafter and before the product is isolated from the reaction mixture.

The products of the present invention have also been found to possess utility as insecticides and toxicants for insecticide compositions, such as sprays and powders in which the compounds are blended with suitable wetting agents, fillers, solvents, adhesives, coating agents, repellents and other ingredients employed in compounding insecticides.

The products of the present invention may be prepared by reacting ethylene diamine with a molecular equivalent or less of an acylating agent comprising an aliphatic monocarboxylic acid having as its alkyl or alkenyl residue one of the radicals described hereinbefore in the definition of $R_1$ with respect to the formula. The acid thus employed will be composed of an alkyl or alkenyl residue of the proper chain length or with the proper branched chain components together with a carboxylic acid group, the carbon atom of which is not included in the contemplation of the chain length hereinbefore described. In place of the acid, the alkyl ester, such as the butyl ester, or desirably the methyl or ethyl ester, may be employed, or the acyl halide such as the acyl chloride, or the acid anhydride.

The resulting mono-acyl amino derivative is then condensed with the aid of a suitable mild dehydrating agent, such as powdered calcium oxide, to form the 2-alkyl (or 2-alkenyl) imidazoline. The derivative thus prepared is then reacted with an alkylating agent having as its alkyl residue one of the residues described hereinbefore in the definition of R with respect to the formula. The alkylating agent may be an alkyl halide, such as lauryl chloride or tridecyl bromide. The product thus prepared is a substituted imidazoline which corresponds to the formula hereinbefore described.

In carrying out the preparation of the N-acyl ethylene diamine, it is desirable to employ anhydrous ethylene diamine. However, ethylene diamine that is not substantially anhydrous may be employed. The anhydrous material facilitates the attainment of somewhat higher yields.

The following examples illustrate the process of the present invention and the compounds resulting therefrom. These examples are to be construed as merely illustrative and not as limiting the scope of the present invention.

EXAMPLE I

*1-n-dodecyl-2-methyl-4,5-dihydroimidazole*

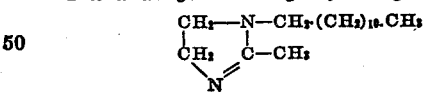

A mixture of 264 grams of anhydrous ethyl acetate (3 moles) and 540 grams of ethylene diamine (9 moles) was heated in an autoclave at 100–110° C. for 36 hours. A pressure of about 20 pounds was developed. The mixture was transferred to a still and the ethanol and excess ethylene diamine were distilled off at about 100 mm. absolute pressure. The fractionation yielded 203 grams (66.5%) of partially crystallized N-acetyl ethylene diamine at 133-139° C./27 mm.

A mixture of 203 grams of N-acetyl ethylene diamine and 560 grams of finely powdered calcium oxide was heated in a flask immersed in an oil bath at 225-235° C. for 14 hours. After cooling to 90-100° C., the mixture was extracted with three 500 cc. portions of alcohol. The alcohol was removed from the extract by distillation and the residue was distilled at atmospheric pressure. B. P. 195-198° C. Yield of 2-methyl-4,5-dihydroimidazole, 88%.

A mixture of 100.8 grams of 2-methyl-4,5-dihydroimidazole, 123.0 grams of n-dodecyl chloride (0.6 mole) and 200 cc. of xylene was refluxed at 148° C. for 16 hours and then cooled to 25° C. A solution of 50 grams of 50% sodium hydroxide solution in 300 cc. of water was added with agitation. The mixture was filtered and the xylene layer was separated from the filtrate. After removal of the xylene under reduced pressure, the residue was distilled, B. P. 177-184° C./6 mm. The yield was 60.7 grams, or 40.2%, calculated on n-dodecyl chloride charged. The product assayed 98.6% of 1-n-dodecyl-2-methyl-4,5-dihydroimidazole.

In place of n-dodecyl chloride, n-dodecyl bromide may be employed.

EXAMPLE II

*1-n-decyl-2-methyl-4,5-dihydroimidazole*

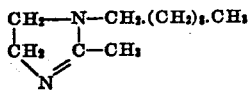

A mixture of 50.0 grams (0.6 mole) of 2-methyl-4,5-dihydroimidazole, prepared according to the method of Example I, 52.8 grams (0.3 mole) of decyl chloride and 100 cc. of benzene was refluxed for 7 hours and cooled to room temperature. The mixture was treated with 150 cc. of water and 24 grams of 50% sodium hydroxide solution with agitation and filtered. The benzene layer of the filtrate was separated and distilled to remove the benzene. The residue was distilled at reduced pressure to recover the product. B. P. 151-155° C./6 mm. Yield of 1-n-decyl-2-methyl-4,5-dihydroimidazole, 41.3%. The product assayed 99.8%.

EXAMPLE III

*1-n-tetradecyl-2-methyl-4,5-dihydroimidazole*

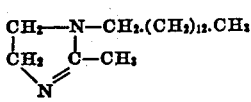

A mixture of 60.7 grams of 2-methyl-4,5-dihydroimidazole prepared according to the method of Example I, 83 grams of tetradecyl chloride and 110 cc. of xylene was refluxed 18 hours at 145° C. The mixture was cooled to room temperature and diluted with 125 cc. of water. To this mixture, 27.5 grams of 50% sodium hydroxide was added with agitation. The resulting mixture was filtered and the xylene layer was separated and distilled to remove the xylene. The residue was distilled at reduced pressure to recover the product. B. P. 190-193° C./6 mm. Yield of 1-n-tetradecyl-4,5-dihydroimidazole, 34%. The product assayed 97.4%.

EXAMPLE IV

*1-n-dodecyl-2-n-amyl-4,5-dihydroimidazole*

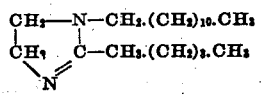

A mixture of 427.7 grams of anhydrous methyl caproate and 592 grams of anhydrous ethylene diamine was reacted according to the method of Example I. The N-caproyl-ethylene diamine obtained was condensed with the aid of anhydrous calcium oxide according to the method of Example I. The product was identified as 2-amyl-4,5-dihydroimidazole. B. P. 150-157° C./34 mm. The yield of this product was 56.8%, based on methyl caproate. The M. P. of the product was 53-54.6° C.

A mixture of 168 grams of 2-amyl-4,5-dihydroimidazole, 123 grams of n-dodecyl chloride and 200 cc. of xylene was reacted according to the method of Example I, and the resulting reaction mixture was treated with 50 grams of 50% sodium hydroxide solution in 300 cc. of water. After filtration, removal of xylene from the nonaqueous layer and distillation of the residue, the product recovered was identified as 1-n-dodecyl-2-n-amyl-4,5-dihydroimidazole.

EXAMPLE V

*1-n-hexadecyl-2-methyl-4,5-dihydroimidazole*

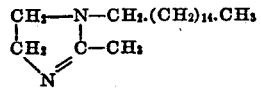

This compound may be prepared by reacting a mixture of 101 grams of 2-methyl-4,5-dihydroimidazole prepared according to Example I, 144 grams of hexadecyl chloride and 110 cc. of xylene and processing the reaction mixture according to the method of Example II.

EXAMPLE VI

*1-n-tridecyl-2-methyl-4,5-dihydroimidazole*

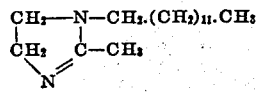

This product was prepared by reacting 2-methyl-4,5-dihydroimidazole with tridecyl bromide according to the method of Example II.

EXAMPLE VII

*1-n-dodecyl-2-ethyl-4,5-dihydroimidazole*

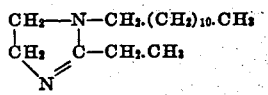

This compound may be prepared by reacting a mixture of anhydrous methyl propionate and an excess of anhydrous ethylene diamine according to the method of Example I to form N-propionyl ethylene diamine. This product may be condensed with calcium oxide according to the method of Example I to form 2-ethyl-4,5-dihydroimidazole. This latter product may be reacted with n-dodecyl chloride according to the method of Example II to form 1-n-dodecyl-2-ethyl-4,5-dihydroimidazole.

Example VIII

1-n-dodecyl-2-propenyl-4,5-dihydroimidazole

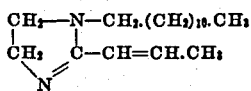

This compound may be prepared by reacting a mixture of anhydrous methyl crotonate and an excess of anhydrous ethylene diamine according to the method of Example I to produce N-crotonyl ethylene diamine. This product may be condensed with calcium oxide according to the method of Example I to produce 2-propenyl-4,5-dihydroimidazole. This latter product may then be reacted with n-dodecyl chloride according to the method of Example I with the resultant production of 1-n-dodecyl-2-propenyl-4,5-dihydroimidazole.

Example IX

1-n-dodecyl-2-isopropyl-4,5-dihydroimidazole

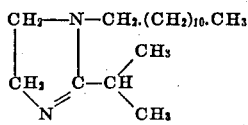

This compound may be prepared by reacting a mixture of anhydrous methyl iso-butyrate and an excess of anhydrous ethylene diamine according to the method of Example I. The resulting product, N-iso-butyryl ethylene diamine, is condensed with calcium oxide according to the method of Example I to produce 2-iso-propyl-4,5-dihydroimidazole. This latter may then be reacted with n-dodecyl chloride according to the method of Example II with the resultant production of 1-n-dodecyl-2-iso-propyl-4,5-dihydroimidazole.

Example X

1-dodecyl-2-iso-butenyl-4,5-dihydroimidazole

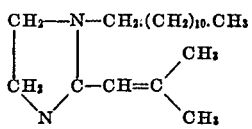

This compound may be prepared by reacting a mixture of anhydrous methyl dimethacrylate and an excess of anhydrous ethylene diamine according to the method of Example I. The product recovered from the reaction mixture, N-dimethacroyl ethylene diamine, is then condensed with calcium oxide with the resultant production of 2-isobutenyl-4,5-dihydroimidazole. This latter product may then be reacted with n-dodecyl chloride according to the method of Example II to form 1-n-dodecyl-2-isobutenyl-4,5-dihydroimidazole.

Example XI

1-(n-dodecen-11-yl-1)-2-methyl-4,5-dihydroimidazole

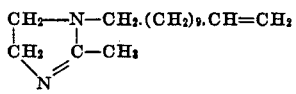

This compound may be prepared by reacting a mixture of 101 grams of 2-methyl-4,5-dihydroimidazole, prepared according to Example I, 122 grams of 11-n-dodecenyl chloride and 200 cc. of xylene according to the method of Example I, and treating resulting reaction mixture as in Example I to recover the product.

Example XII

1-(n-tetradecen-12-yl-1)-2-propenyl-4,5-dihydroimidazole

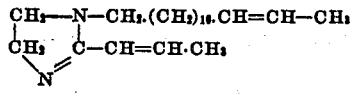

This compound may be prepared by reacting a mixture of 132 grams of 2-propenyl-4,5-dihydroimidazole, prepared as in Example VIII according to the method of Example I, 138 grams of 12-tetradecenyl chloride and 200 cc. of xylene according to the method of Example I, and treating resulting reaction mixture as in Example I to recover the product.

As illustrative of the outstanding therapeutic utility of the compounds of the present invention, 1-n-dodecyl-2-methyl-4,5-dihydroimidazole was tested in vitro against haemolytic streptococcus cultures at dilutions of $10^{-3}$ and $10^{-5}$ for the culture and dilutions of 1:10,000 to 1:2500 for the compound. In each instance there was no evidence of growth of the bacteria after 18 hours at 37° C.

As illustrative of the insecticide utility of the compounds of the present invention, 1-n-dodecyl-2-methyl-4,5-dihydroimidazole was tested in a deodorized kerosene spray base on second instar nympths of German roaches. The solution was found to be highly toxic to these roaches. For example, a 10% solution was found to have a Lethane rating of +6.55 and a 5% solution was found to have a Lethane rating of +5.87. Lethane is a standard insecticide toxicant identified as β-butoxy-β'-thiocyanodiethyl ether. The Lethane rating was computed by subtracting the % kill with 1-n-dodecyl-2-methyl-4,5-dihydroimidazole from the % kill with Lethane and dividing the result by the % kill with Lethane. The results indicate that the new compound is approximately 60% more toxic than Lethane.

In addition to the aforescribed therapeutic and insecticide applications, other therapeutic and insecticide applications of the derivatives of the present invention have been made with desirable results in instances in which results were not predictable.

In addition to the aforescribed compounds of this invention, compounds having utility as therapeutic and insecticide agents may be prepared by alkylating unsubstituted 4,5-dihydroimidazole with an alkylating agent such as an alkyl halide or alkenyl halide having a hydrocarbon radial selected from the group of hydrocarbon radicals defined hereinbefore as R. Illustrative compounds of this type are: 1-n-dodecyl-4,5-dihydroimidazole, 1-(n-dodecen-11-yl-1)-4,5-dihydroimidazole, 1-n-undecyl-4,5-dihydroimidazole, 1-n-dodecyl-4,5-dihydroimidazole, 1-n-tridecyl-4,5-dihydroimidazole, 1-n-tetradecyl-4,5-dihydroimidazole, 1-n-pentadecyl-4,5-dihydroimidazole and 1-n-hexadecyl-4,5-dihydroimidazole. The alkylation of unsubstituted 4,5-dihydroimidazole in the 1-position may be conducted according to the method of Example II.

I claim:

1. Substituted dihydroimidazoles of the formula type:

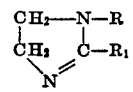

in which R represents an acylic hydrocarbon radical having from 10 to 16 carbon atoms in its structure and $R_1$ represents an acyclic hydrocarbon radical having from 1 to 5 carbon atoms in its structure.

2. Substituted dihydroimidazoles of the formula type:

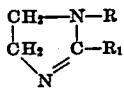

in which R represents a straight chain alkyl radical having from 10 to 16 carbon atoms in its structure and $R_1$ represents an acyclic hydrocarbon radical having from 1 to 5 carbon atoms in its structure.

3. The 1-n-decyl-2-methyl-4,5-dihydroimidazole of the formula:

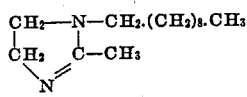

4. The 1-n-dodecyl-2-methyl-4,5-dihydroimidazole of the formula:

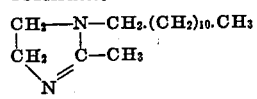

5. The 1-n-tetradecyl-2-methyl-4,5-dihydroimidazole of the formula:

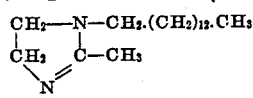

6. Acid salts of the compounds defined in claim 1.

7. A process for preparing compounds of the formula type:

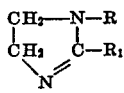

in which R represents an acyclic hydrocarbon radical having from 10 to 16 carbon atoms in its structure and $R_1$ represents an acyclic hydrocarbon radical having from 1 to 5 carbon atoms in its structure, said process comprising reacting ethylene diamine with an alkyl ester of a monocarboxylic acid in which a carboxylic group is attached to a radical selected from the group of radicals defined hereinbefore as $R_1$, heating the ethylene diamine derivative thus formed in the presence of a mild dehydrating agent, and reacting the derivative thus formed with an alkyl halide having an alkyl radical selected from the group of radicals defined hereinbefore as R.

8. A process for preparing compounds of the formula type:

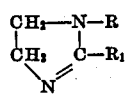

in which R represents a straight chain alkyl radical having from 10 to 16 carbon atoms in its structure and $R_1$ represents an acyclic hydrocarbon radical having from 1 to 5 carbon atoms in its structure, said process comprising reacting ethylene diamine with an alkyl ester of a monocarboxylic acid in which a carboxylic group is attached to a radical selected from the group of radicals defined hereinbefore as $R_1$, heating the ethylene diamine derivative thus formed in the presence of a mild dehydrating agent, and reacting the derivative thus formed with an alkyl halide having an alkyl radical selected from the group of radicals defined hereinbefore as R.

9. Dihydroimidazoles selected from the group consisting of substituted dihydroimidazoles of the formula type:

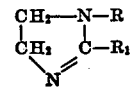

in which R represents an acyclic hydrocarbon radical having from 10 to 16 carbon atoms in its structure and $R_1$ represents an acyclic hydrocarbon radical having from 1 to 5 carbon atoms in its structure, and acid salts thereof.

LUCAS P. KYRIDES.